(12) United States Patent
Perdichizzi

(10) Patent No.: US 10,564,445 B2
(45) Date of Patent: Feb. 18, 2020

(54) SPECTACLE WITH ADJUSTABLE ARMS

(71) Applicant: OCCHIALI 2.0 S.r.l., Barcellona Pozzo di Gotto (ME) (IT)

(72) Inventor: Francesco Perdichizzi, Barcellona Pozzo di Gotto (IT)

(73) Assignee: OCCHIALI 2.0 S.R.L., Barcellona Pozzo di Gotto (ME) (IT)

( * ) Notice: Subject to any disclaimer, the term of this patent is extended or adjusted under 35 U.S.C. 154(b) by 0 days.

(21) Appl. No.: 15/571,497

(22) PCT Filed: May 12, 2016

(86) PCT No.: PCT/IB2016/052719
§ 371 (c)(1),
(2) Date: Nov. 2, 2017

(87) PCT Pub. No.: WO2016/185328
PCT Pub. Date: Nov. 24, 2016

(65) Prior Publication Data
US 2018/0129069 A1    May 10, 2018

(30) Foreign Application Priority Data

May 18, 2015   (IT) .................. 102015000015566

(51) Int. Cl.
*G02C 5/20* (2006.01)
*G02C 5/14* (2006.01)
*G02C 5/22* (2006.01)

(52) U.S. Cl.
CPC .............. *G02C 5/20* (2013.01); *G02C 5/143* (2013.01); *G02C 5/146* (2013.01); *G02C 5/2263* (2013.01);

(Continued)

(58) Field of Classification Search
CPC ... G02C 5/20; G02C 5/14; G02C 5/22; G02C 5/16; G02C 5/2254; G02C 5/146;
(Continued)

(56) References Cited

U.S. PATENT DOCUMENTS

| 4,781,450 A | 11/1988 | Danloup et al. |
| 5,652,635 A * | 7/1997 | Kirschner ............... G02C 11/02 351/121 |
| 6,193,368 B1 * | 2/2001 | George .................... G02C 5/00 351/111 |

FOREIGN PATENT DOCUMENTS

GB            157004 A       1/1921

* cited by examiner

*Primary Examiner* — Jie Lei
(74) *Attorney, Agent, or Firm* — Volpe and Koenig, P.C.

(57) ABSTRACT

Spectacles include a front frame and a pair of arms, each arm extends between a first end attached to the front frame and a second, longitudinally opposed end. Each arm includes a first portion associated with the first end and extending along a first axis, and a second portion, associated with the second end, extending along a second axis, the portions abutting one another at a first bearing plane, not perpendicular to the first and second axes, and rotatable about an adjustment axis perpendicular to the first bearing plane to vary inclination between the first and the second axes. The first portion includes first and second elements, abutting one another at a second bearing plane perpendicular to the first axis, the elements being selectively rotatable about the first axis. The second portion includes third and fourth elements, abutting one another at a third bearing plane perpendicular to the second axis.

20 Claims, 4 Drawing Sheets

(52) U.S. Cl.
CPC ..... *G02C 2200/04* (2013.01); *G02C 2200/08* (2013.01); *G02C 2200/18* (2013.01)

(58) Field of Classification Search
CPC ...... G02C 5/143; G02C 5/2263; G02C 11/02; G02C 2200/18; G02C 2200/04; G02C 2200/08
USPC ......... 351/118, 119, 111, 113, 114, 121, 140
See application file for complete search history.

SPECTACLE WITH ADJUSTABLE ARMS

TECHNICAL FIELD

The present invention relates to spectacles provided with a mechanism for adjusting the arms, having the characteristics disclosed in the precharacterizing clause of the main claim.

BACKGROUND ART

It is known that, in order to carry out their function correctly, spectacles must be positioned in a specific predetermined way relative to the eyes of the person wearing them. This is particularly true of spectacles fitted with corrective lenses (prescription glasses) which must be positioned at specific distances and angles.

One of the parameters which must be met in the positioning of lenses relative to the eyes, and which is particularly critical in the case of progressive lenses, is the pantoscopic angle, that is to say the angle formed by the plane of the lens relative to the vertical plane.

The anatomical characteristics of the person for whom the spectacles are intended may differ widely from one patient to another, making it virtually impossible to construct spectacles that can be adapted in advance to the faces of all possible users.

Moreover, even if the anatomical characteristics of the user are the same, the correct pantoscopic angle also varies according to the type of lenses fitted.

In some cases, the pantoscopic angle is briefly adjusted by the optician at the moment of preparation of the spectacles, by manual adjustment of the arms, which are bent, after being heated if necessary, by making use of the deformability characteristics of their constituent material.

The same procedures are sometimes used for the adjustment of other geometrical and dimensional characteristics of the arms, which must be adapted to the anatomical configuration of the user.

A first of these characteristics is the length of the arm before the curvature of the terminal ends, intended to be supported behind the user's ear.

If this length is excessive, the spectacles tend to slide forwards whenever the head is lowered, whereas if this length is too small, the curved termination bears directly on the ear, causing a painful sensation in the user.

A second dimensional characteristic of the arm that is adapted to the anatomical configuration of the user's head is the inclination of the curvature of the terminal end of the arm towards the head.

Indeed, in many models of spectacles, provision is made to curve the terminal end of the arm slightly towards the other arm of the spectacles, so as to follow the curvature of the head behind the ear and make the positioning of the spectacles more stable.

If the terminal end is excessively inclined, the pressure exerted by it on the head may cause irritation and pain to the user, whereas, if the inclination is small, the gripping action is reduced.

However, this type of adjustment is evidently approximate and usually non-reproducible.

In other types of spectacles, the material or shape of the arms is such that the pantoscopic angle or other dimensional characteristics of the arm cannot be modified, even by using the empirical method described above.

In this case, it may become unavoidable to replace the arm provided on the spectacles with an arm having different dimensions and geometry.

In these circumstances, however, the optician has to provide a suitable selection of different arms for each model of spectacles, thereby increasing the costs and the storage requirements.

DESCRIPTION OF THE INVENTION

The problem tackled by the present invention is that of providing spectacles with adjustable arms which are structurally and functionally designed to overcome the limitations described above with reference to the cited prior art.

Within the scope of this problem, one object of the invention is to provide spectacles enabling the pantoscopic angle to be adjusted rapidly, effectively and reliably by modifying the vertical inclination of the arms relative to the front frame. Another object of the invention is to enable the length of the arm up to its terminal end to be adjusted.

Yet another object is to allow the adjustment of the inclination of the terminal end of the arm towards the head.

This problem is resolved and these objects are achieved by the present invention by means of spectacles made in accordance with the following claims.

BRIEF DESCRIPTION OF THE DRAWINGS

The characteristics and advantages of the invention will be more fully apparent from the detailed description of a preferred example of embodiment thereof, illustrated, for guidance and in a non-limiting way, with reference to the attached drawings, in which.

PREFERRED EMBODIMENT OF THE INVENTION

In the figures, the number 1 indicates the whole of a pair of spectacles made according to the present invention.

The spectacles 1 can be made of any suitable material, such as metal or plastic material, and comprise a front frame 2, on which a pair of lenses are fitted and to the ends of which arms 10 are fastened.

The lenses may be corrective or protective lenses, and may be fitted to the front frame in any known way, for example by using lens-holding rims or in a rimless configuration.

In the attached figures, one of the arms has been omitted to increase the clarity of the drawing, but the following description of one arm is to be considered equally valid for the other.

Each arm 10 extends between a first end 11 attached to the front frame 2 and a second longitudinally opposed end 12.

In the preferred version described here, the second end 12 is curved downwards to form an arm termination 12a intended to bear on the head behind the ear.

However, it is also specified that the second end 12 of the arm may be shaped in a different way, being, for example, straight or curved inwards to follow the profile of the user's head towards the nape. Additionally, the termination may be made of the same material as the arm, or may be formed by a component of different material fastened to the arm in a subsequent moment.

The arms 10 may have any desired shape, even if a substantially circular shape with a circular cross section is preferred.

Figure 1:
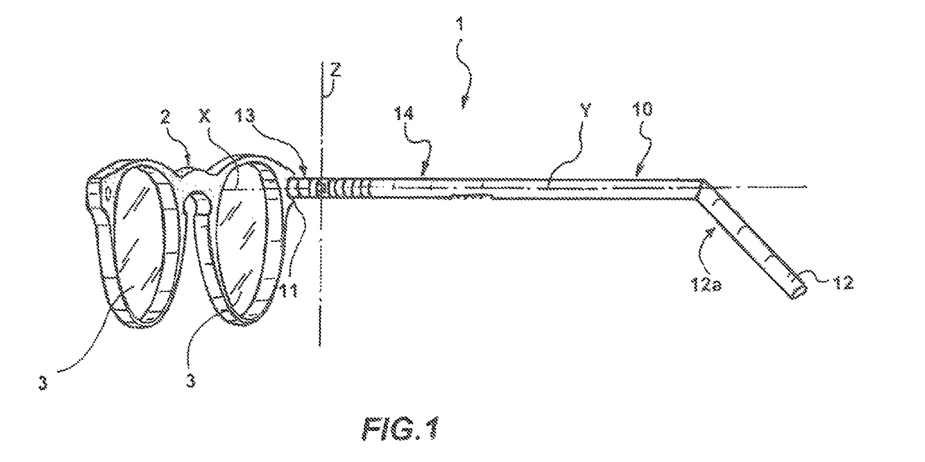
FIG. 1 is a side perspective view of a pair of spectacles with an arm in the open position, made according to the present invention.

Each arm 10 comprises a first section indicated as a whole by 13, which is attached to the front frame 2 at the first end 11, and a second section 14, extending from the first section 13 up to the second end 12. A hinge mechanism 15 is provided between the first section 13 and the second section 14 to allow the second section 14 to swing about a hinge axis Z between an open position of the arm 10, in which the second section 14 is swung away from the front frame 2 (FIG. 1) and a closed position of the arm 10 in which the second section 14 is swung to a position next to the front frame 2.

Preferably, the hinge axis Z extends along a substantially vertical direction when the spectacles are worn by a user in a normal position, this axis being substantially parallel to the front frame 2.

According to a first aspect of the present invention, each arm 10 comprises a mechanism for adjusting of the inclination of the arm on a vertical plane thereof orthogonal to the front frame 2. Thus the pantoscopic angle of the front frame 2 can conveniently be varied. Moreover, since each arm 10 is adjustable independently of the other, this mechanism advantageously allows the spectacles 1 to be positioned correctly on patients whose ears are not perfectly aligned in respect of their height.

For this purpose, each arm 10 comprises a first portion 20 associated with the first end 11 and extending along a first axis X, and a second portion 30, adjacent to the first portion 20, which is associated with the second end 12 and extends along a second axis Y coplanar with the first axis X.

The second portion 30 abuts the first portion 20 at a first bearing plane A which is advantageously not perpendicular to the first and second axes X and Y. The second portion 30 is also selectively rotatable relative to the first portion 20 about an adjustment axis K perpendicular to the first bearing plane A.

Figure 2:
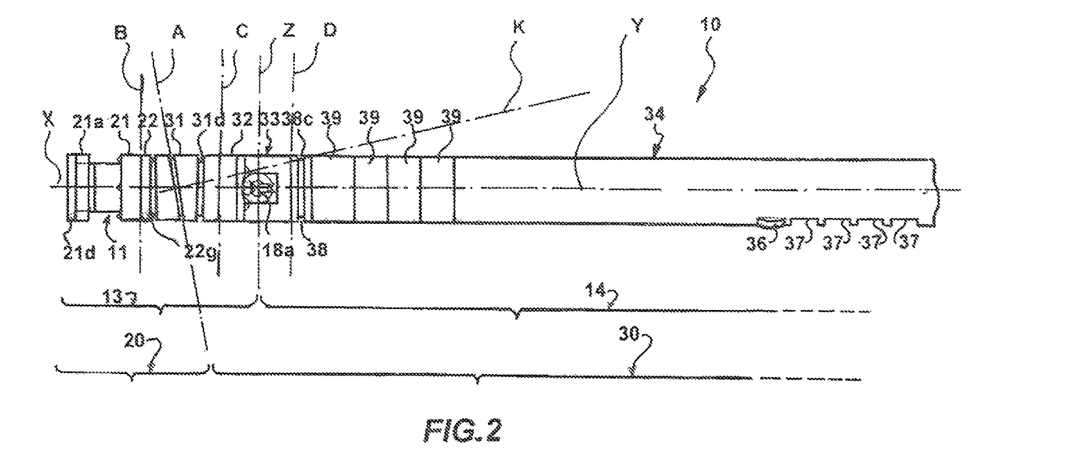
FIG. 2 is a side view, on an enlarged scale, of a portion of the arm of the spectacles of FIG. 1.
Figure 3:
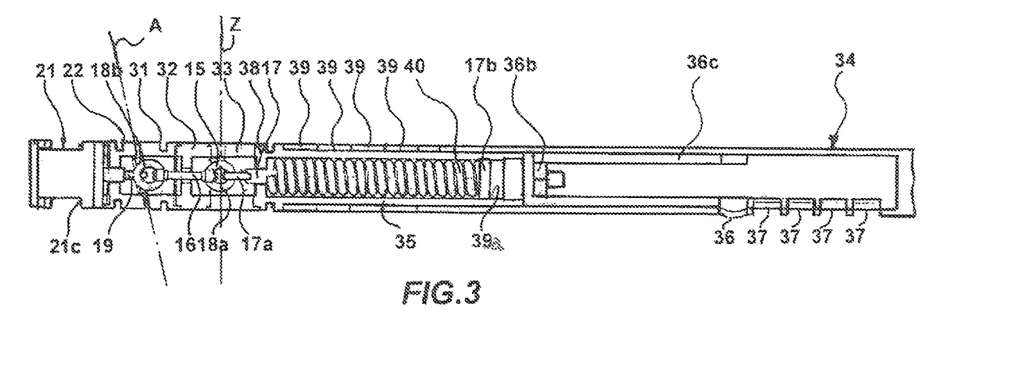
FIG. 3 is a view in longitudinal section of the arm of FIG. 2.
Figure 4:
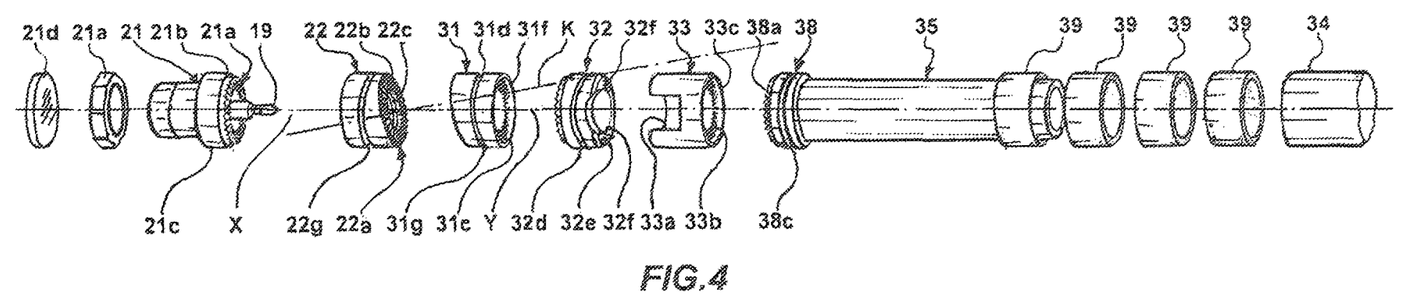
FIGS. 4 and 5, respectively, are perspective views from different angles of some components of the arm of FIG. 2 in an exploded view.
Figure 5:
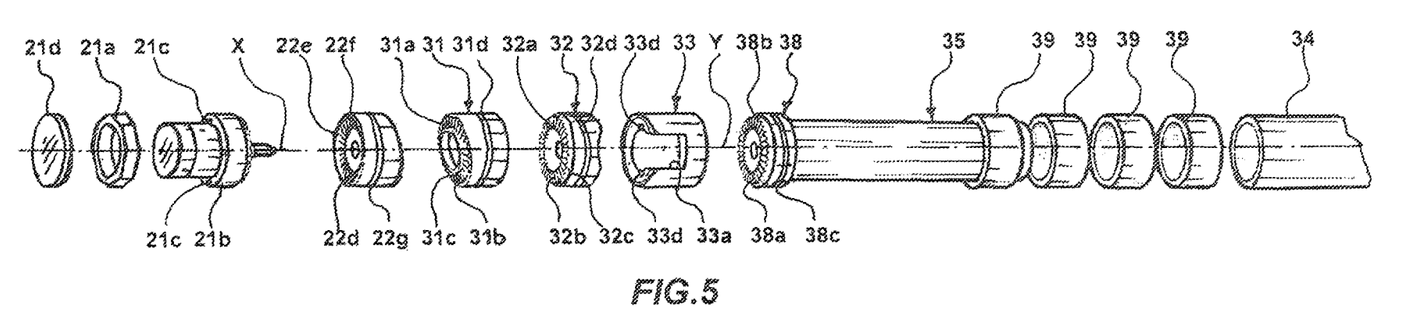
Figure 6:
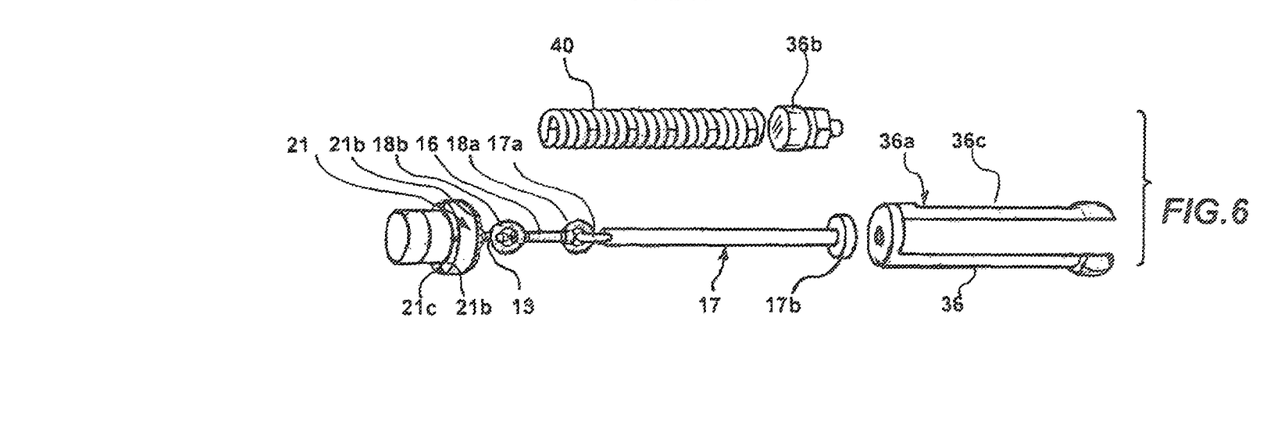
FIG. 6 is a perspective view of further components of the arm of FIG. 2 in an exploded view.

Preferably, the first and the second portion 20, 30 are arranged so that, in an initial configuration of the arm 10, the respective axes X and Y are substantially aligned with one another (FIG. 2).

Preferably, the adjustment axis K is inclined relative to the first axis X and to the second axis Y at an angle of more than 0° and up to 45°, or more preferably in the range from 1° to 30°; even more preferably, it is inclined at an angle in the range from 5° to 20°, at about 10° for example.

As described more in detail below, the rotation between the first and second portions 20, 30 about the adjustment axis K causes a non-alignment of the first and second axes X and Y such that the second portion 30 is progressively inclined relative to the first portion 20.

The first portion 20 comprises a first element 21 attached to the front frame 2 and a second element 22 bearing against the first element 21 on the opposite side from the front frame 2. The first element 21 and the second element 22 abut one another at a second bearing plane B perpendicular to the first axis X, in such a way that they are selectively rotatable relative to one another about the first axis X. The second element 22 has, on the opposite side from the first element 21, an inclined bearing surface 22a, forming the first bearing plane A of the first portion 20.

Similarly, the second portion 30 comprises a third element 31 abutting the second element 22 of the first portion 20 at the first bearing plane A, and a fourth element 32 abutting the third element 31 on the opposite side from the second element 22. The third element 31 and the fourth element 32 abut one another at a third bearing plane C perpendicular to the second axis Y and are selectively rotatable relative to one another about the second axis Y. The third element 31 has, on the opposite side from the fourth element 32, an inclined bearing surface 31a, forming the first bearing plane A of the second portion 30.

In the preferred example described here, in which the arm 10 has a substantially cylindrical shape with a circular cross section, the two bearing surfaces 22a and 31a are elliptical.

Preferably, the third element 31 of the second portion 30 is movable relative to the second element 22 of the first portion 20 between an engaged position, in which they are rotationally fixed to one another, that is to say in which their relative rotation is prevented, and an adjustment position, in which the third element 31 can be rotated about the adjustment axis K.

More precisely, in the engaged position, the third element 31 abuts the second element 22 with their respective bearing surfaces 31a and 22a in mutual contact along the first bearing plane A, while in the adjustment position the third element 31 is spaced apart from the second element 22. To move from the engaged position to the adjustment position and vice versa, the third element 31 can be translated to a limited extent relative to the second element 22.

In order to fix the third element 31 and the second element 22 together with respect to rotation in the engaged position, front toothed rings 31b and 22b, which can engage with one another, are formed on the bearing surfaces 31a and 22a respectively. To facilitate this engagement, the teeth of the toothed rings 32b and 22b preferably have a triangular convergent profile.

Additionally, in order to improve the centring of the coupling between the third element 31 and the second element 22 in the engaged position, a collar with a circular cross section 31c extends axially from the bearing surface and can be received in a corresponding seat 22c formed on the bearing surface 22a of the second element 22.

The collar 31c and the corresponding seat 22c are placed in radially inner positions relative to the front toothed rings 31b and 22b.

As detailed below, the third element 31 and the second element 22 are biased elastically towards the engaged position.

Preferably, to facilitate the gripping of the third element 31 and its translation away from the second element 22, a circumferential groove 31d is formed on an outer surface of the third element 31.

The methods of coupling between the first element 21 and the second element 22, and between the third element 31 and the fourth element 32, are entirely similar to those described above with reference to the second element 22 and the third element 31.

Accordingly, the second element 22 is translatable to a limited extent along the first axis X relative to the first element 21 between an engaged position, in which it is rotationally fixed to the first element 21, and an adjustment position, in which it can be rotated relative to the first element 21 about the first axis X.

As above, in the engaged position, the second element 22 abuts the first element 21 with their respective bearing surfaces 22d and 21a in mutual contact along the second bearing plane B, while in the adjustment position the second element 22 is spaced apart from the first element 21.

Front toothed rings 22e and 21b with a triangular and convergent profile, which can engage with one another, are also formed on the bearing surfaces 22d and 21a respectively, to rotationally fix the first element 21 and the second element 22 in the engaged position.

Additionally, in order to improve the centring of the coupling between the first element 21 and the second element 22 in the engaged position, a collar with a circular cross section 22f extends axially from the bearing surface 22d and can be received in a corresponding seat 21c formed on the bearing surface 21a of the first element 21.

Preferably, the collar 22f and the corresponding seat 21c are placed in radially outer positions relative to the front toothed rings 22e and 21b, substantially forming a prolongation of the outer surface of the second element 22 so as to conceal the front toothed rings 22e and 21b from view and provide a continuous surface between the first and second element 21, 22 when they are moved into the engaged position.

In this case also, the first element 21 and the second element 22 are biased elastically towards the engaged position. A circumferential groove 22g is formed on the outer surface of the second element 22, to facilitate the gripping of the second element 22 and its translation away from the first element 21.

Correspondingly, the fourth element 32 is translatable to a limited extent along the second axis Y relative to the third element 31 between an engaged position, in which it is rotationally fixed to the third element 31, and an adjustment position, in which it can be rotated relative to the third element 31 about the second axis Y.

In the engaged position, the fourth element 32 abuts the third element 31 with their respective bearing surfaces 32a and 31e in mutual contact along the third bearing plane C, while in the adjustment position the fourth element 32 is spaced apart from the third element 31.

Front toothed rings 32b and 31f with a triangular and convergent profile, which can engage with one another, are formed on the bearing surfaces 32a and 31e respectively, to rotationally fix the third element 31 and the fourth element 32 in the engaged position.

Additionally, in order to improve the centring of the coupling between the third element 31 and the fourth element 32 in the engaged position, a collar with a circular cross section 31g extends axially from the bearing surface 31f and can be received in a corresponding seat 32c formed on the bearing surface 32a of the fourth element 32.

Preferably, the collar 31g and the corresponding seat 32c are placed in radially outer positions relative to the front toothed rings 32b and 31f, substantially forming a prolongation of the outer surface of the third element 31 so as to conceal the front toothed rings 32b and 31f from view and provide a continuous surface between the third and fourth element 31, 32.

In this case also, the third element 31 and the fourth element 32 are biased elastically towards the engaged position. A circumferential groove 32d is formed on the outer surface of the fourth element 32, to facilitate the gripping of the fourth element 32 and its translation away from the third element 31.

The components of the mechanism for adjusting the vertical inclination of the arm described above can be arranged on one or other side of the hinge axis Z.

In particular, in an embodiment of the invention which is not shown in the attached drawings, the first, second and third bearing planes A, B and C intersect the arm 10 in the second section 14.

In this embodiment, the hinge axis Z is not affected by the adjustment of the vertical inclination of the arm 10 and can be placed as closely as desired to the front frame 2.

In the preferred embodiment described here with reference to the attached drawings, the first, second and third bearing planes A, B and C intersect the arm 10 in the first section 13, so that the mechanism for adjusting the vertical inclination of the arm is located between the hinge axis Z and the front frame 2.

In this embodiment, the arm 10 is inclined from a point as close as possible to the front frame 2, providing a more uniform aesthetic appearance.

The hinge mechanism 15 comprises a first pin 16, extending inside the first section 13 and translationally fixed relative to the front frame 2 and a second pin 17, received translatably inside the second section 14 and pivoted on the first pin 16 on the hinge axis Z.

To allow the first pin 16 to pass through the first section 13, the third element 31 and the fourth element 32 are penetrated by an axial through hole.

The first pin 16 and the second pin 17 are preferably pivoted by means of a ring coupling, formed by a ring (open or closed) provided at the end of one of the two pins and inserted into another ring (open or closed) provided at the end of the other of the two pins.

Thus the shape of the coupling does not prevent the oscillation, albeit limited, of the two pins about axes other than the hinge axis Z.

Accordingly, at one end of the first pin 16 there is provided a closed ring 18a which is attached to an open ring 17a formed at one end of the second pin 17 on the hinge axis Z.

The first pin 16 is also attached, by means of a second closed ring 18b provided at its opposite longitudinal end, to a hook 19 fixed to the element 21, which in turn is fixed to the front frame 2.

In particular, the hook 19 extends axially from the first element 21 through the second element 22, in an axial through hole in the latter, so that the coupling to the second ring 18b is preferably provided at the first bearing plane A.

Preferably, the first and second rings 18a, 18b are free to rotate axially relative to the pin 16.

The first element 21 forms the first end 11 and is fixed to the front frame 2, and is attached to the latter by being screwed to it by means of a nut 21a, covered if necessary by a masking element 21d. To reinforce the attachment to the front frame 2, appendages 21c protruding on the opposite side from the hook 19 are also provided on a shoulder 21b of the first element 21, these appendages being insertable into the front frame 2, if the latter is made of plastic material.

On the other hand, if the front frame 2 and the arms 10 are made of metal material, the attachment can be provided by welding.

As stated above, the hinge axis Z passes through the second portion 30 of the arm 10.

Preferably, the end part of the first section 13 pivoted on the second section 14 is formed by the fourth element 32 of the second portion 30, which, on its opposite side from the bearing surface 32a, encounters a fifth element 33, forming the end part of the second section 14 on the hinge axis Z.

To facilitate the oscillation of the second section 14 in the closed position of the arm 10, the fifth element 33 has an aperture 33a, extending axially along the outer shell of the fifth element 33, opening on to the surface facing the fourth element 32 and facing the direction of oscillation for the closure of the arm 10.

Similarly, a recess 32e is formed on the surface of the fourth element 32 facing the fifth element 33.

Additionally, an anti-rotation element is preferably provided between the fourth and the fifth element 32, 33, this element preventing the relative rotation between the fourth and the fifth element 32, 33 about the first axis X.

For example, this anti-rotation element may comprise one or more appendages 32f protruding from the fourth element 32 and received in engagement in one or more corresponding seats 33d formed on the fifth element 33.

The second section 14 further comprises a terminal body 34, fixed to the second end 12, which is fitted slidably along the second axis Y on an inner body 35 of the second section 14.

The terminal body 34 may have any desired external shape, provided that it can slide and rotate relative to the inner body 35, as described more fully below.

The inner body 35 is telescopically inserted into the terminal body 34 and is selectively attachable thereto in a plurality of predetermined extension positions by means of a snap-fitting between an elastically deformable tab 36, fixed to the inner body 35, and a corresponding plurality of seats 37 formed in an axially spaced position on the terminal body 34, in which the tab can engage. Preferably, the tab 36 forms part of a fork-like element 36a, attached removably to the remaining part of the inner body 35, by means of a screw device 36b, and comprising a strip 36c, encountering the inner wall of the terminal body 35 on the opposite side from the tab 36.

Alternatively, the coupling between the inner body 35 and the terminal body 34 may be made by means of a screw that can be inserted into a plurality of holes that can be aligned with one another, these holes being provided on the inner body 35 and/or on the terminal body 34.

At the opposite end to the terminal body 34, the inner body 35 has a flange 38 which has outer dimensions similar to those of the terminal body 34, so as to prevent the full insertion of the inner body 35 into the terminal body 34.

To avoid discontinuities in the outer surface of the arm 10, when the terminal body 34 is moved along the inner body 35 away from the flange 38 for the elongation of the arm 10, provision is made for the interposition of one or more ring-shaped spacer elements 39 between the flange 38 of the inner body 35 and the terminal body 34, these elements being fitted removably on the inner body 35.

An axially extending chamber 39a is also formed in the inner body 35, the second pin 17 and an elastic element 40 fitted on the second pin 17 being housed in this chamber. The elastic element 40 acts between the flange 38 and a head 17b of the second pin 17, so as to bias the second pin 17 towards the inside of the chamber 39a.

The action of the elastic element 40 not only creates axial tension on the first and second pins 16 and 17, but also biases all the elements between the inner body 35 and the first element 21 towards one another. In particular, the action of the elastic element 40 biases the first, second, third and fourth elements 21, 22, 31, 32 towards the engaged position.

The flange 38 of the inner body 35 also abuts the opposite side of the fifth element 33 from the terminal body 34, the fifth element also having the second pin 17 passing through it.

The inner body 35 is also selectively rotatable relative to the fifth element 33 about the second axis Y, thus forming in the second section 14 an auxiliary articulation which allows the rotation about the second axis Y of the terminal body 34 and therefore of the second end 12 of the arm 10, independently of the hinge mechanism and of the mechanism for adjusting the vertical inclination of the arm. Preferably, the inner body 35 is translatable to a limited extent along the second axis Y relative to the fifth element 33 between an engaged position, in which it is rotationally fixed to the fifth element 33, and an adjustment position, in which it can be rotated relative to the fifth element 33 about the second axis Y.

In the engaged position, the flange 38 of the inner body 35 abuts the fifth element 33 with their respective bearing surfaces in mutual contact along a fourth bearing plane D, while in the adjustment position the flange 38 is spaced apart from the fifth element 33. The rotational fixing between the two elements is provided by respective front toothed rings 38a, 33b with a triangular and convergent profile, which can engage with one another and are formed on the respective bearing surfaces.

Additionally, in order to improve the axial centring of the coupling between the fifth element 33 and the inner body 35 in the engaged position, a collar with a circular cross section 33c extends axially from the bearing surface of the fifth element 33 and can be received in a corresponding seat 38b formed on the flange 38.

Preferably, the collar 33c and the corresponding seat 38b are placed in radially outer positions relative to the front toothed rings 38a and 33b, substantially forming a prolongation of the outer surface of the fifth element 33 so as to conceal the front toothed rings from view and provide a continuous surface between the flange 38 and the fifth element 33 when they are moved into the engaged position. The inner body 35 and the fifth element 33 are biased elastically towards the engaged position by the elastic element 40. A circumferential groove 38c is formed on the outer surface of the flange 38, to facilitate the gripping of the inner body 35 and its translation away from the fifth element 33.

In the initial configuration, the arm 10 has its first and second axes X and Y aligned with one another along a common longitudinal direction of the arm, and all the elements are moved into the engaged position, as seen in FIG. 2.

In this configuration, the second section 14 of the arm 10 can oscillate about the substantially vertical hinge axis Z, between the closed position, in which it is placed adjacent to the front frame 2, and the open position, in which it extends substantially perpendicularly to the front frame 2.

Additionally, because of the particular configuration of the hinge mechanism which allows the second pin 17 to slide inside the second section 14, and because of the provision of the elastic element 40, the second section 14 can perform an extra oscillation in any outward direction, being returned by the elastic element 40 to the open position.

The operation of the mechanism for adjusting the vertical inclination of the arm 10 will now be described, with reference principally to FIGS. 7a to 7d, in which the plane R formed by the second portion 20 and the hinge axis Z is compared with a vertical plane V. For simplicity, the second end 12 of the arm 10, curved downwards, is also considered to belong to the plane R, although its inclination relative to the second axis Y can be adjusted independently, as detailed below.

Figure 7A:
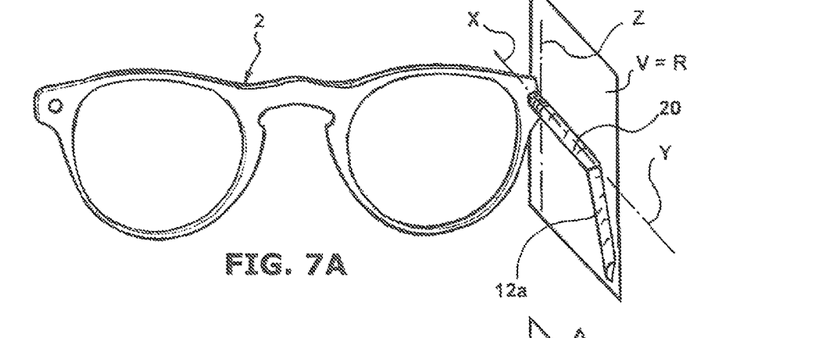
FIGS. 7A to 7D are views of the spectacles of FIG. 1 in successive moments of the step of adjusting the vertical inclination of the arm for the adjustment of the pantoscopic angle.

The vertical inclination of the arm 10 is adjusted by a sequence of relative rotations, starting from the initial configuration shown in FIG. 7a. In particular, the adjustment includes a first relative rotation between the second element 22 of the first portion 20 and the third element 31 of the second portion 30 about the adjustment axis K, a subsequent relative rotation between the first element 21 and the second element 22 of the first portion 20 about the first axis X, and, finally, a relative rotation between the third element 31 and the fourth element 32 of the second portion 30 about the second axis Y.

To perform the first rotation, the third element 31 of the second portion 30 is translated along the first axis X away from the second element 22 of the first portion 20, overcoming the action of the elastic element 40, to a sufficient extent to disengage the front toothed rings 31b, 22b, thereby reaching the adjustment position.

Preferably, the translation of the third element 31 may be performed by means of a suitable instrument which engages the groove 31d.

When in the adjustment position, the third element 31 can be rotated about the axis K through a suitable angle, thereby inclining the second axis Y relative to the first axis X to a desired extent, and can then be released so that the action of the elastic element 40 returns it to the engaged position.

Figure 7B:
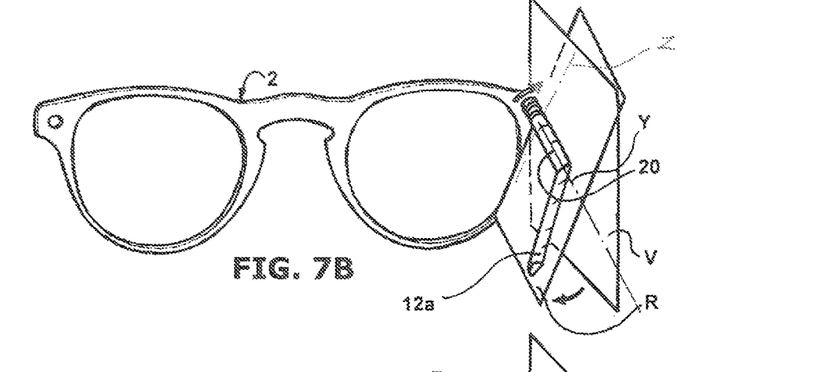

In this situation, the plane R is inclined relative to the plane V (FIG. 7b).

The provision of the ring coupling between the second ring 18b of the first pin 16 and the hook 19 on the first bearing plane A provides the degree of freedom required to enable the first axis X to be inclined relative to the second axis Y.

It should be noted that, in this configuration, the second section 14 of the arm would not be closed correctly adjacent to the front frame 2, because the hinge axis Z is inclined relative to the vertical plane.

The second rotation takes place between the first element 21 and the second element 22 of the first portion 20 about the first axis X by procedures similar to those described above. The second element 22 is therefore translated into the adjustment position against the action of the elastic element 40 and rotated about the first axis X.

Thus the position of the plane formed by the first and second axes X, Y relative to the first element 21 is rotated.

In particular, this second rotation is performed in the opposite direction to the first rotation and to an extent such that the second section 14, with the possible exception of the second, curved end 12, is returned to the vertical plane R.

Figures 7C, 7D:
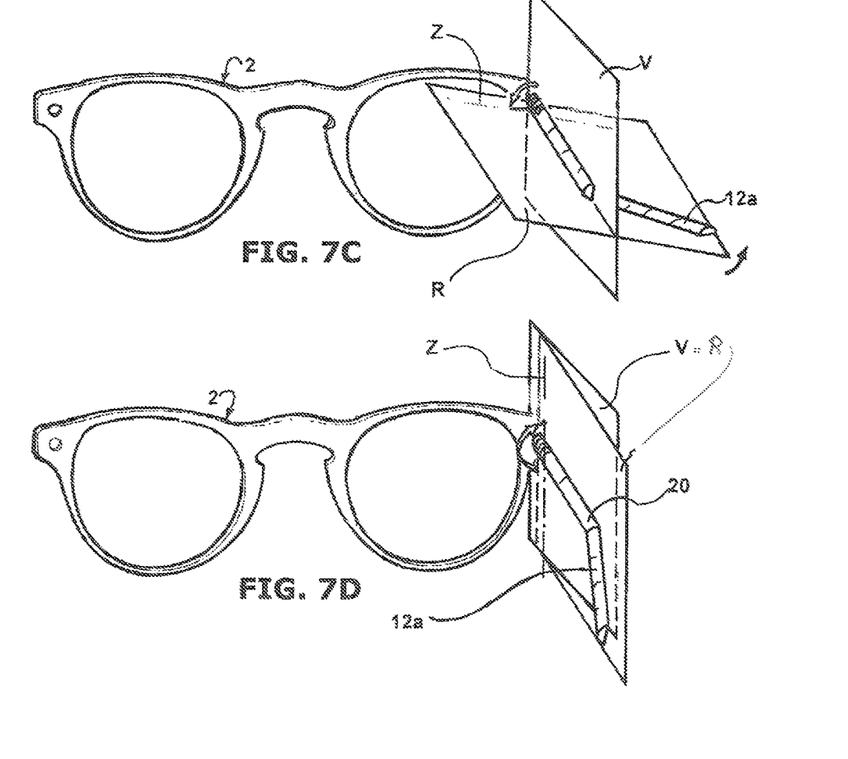

In this situation, shown in FIG. 7c, the plane R, together with the hinge axis Z is still substantially inclined relative to the vertical plane V, and consequently the closure of the arm 10 would still be incorrect.

The third and final rotation takes place between the third element 31 and the fourth element 32 of the second portion 20 about the second axis Y, by procedures similar to those described above. The fourth element 32 is therefore translated into the adjustment position away from the third element 31 and rotated about the second axis Y.

In particular, this third rotation is performed in the opposite direction to the second rotation and to an extent such that the plane R, comprising the hinge axis Z and the second end 12, is rotated about the second axis Y, positioned on the vertical plane V, until it coincides with the vertical plane V (see FIG. 7d).

Figure 8:
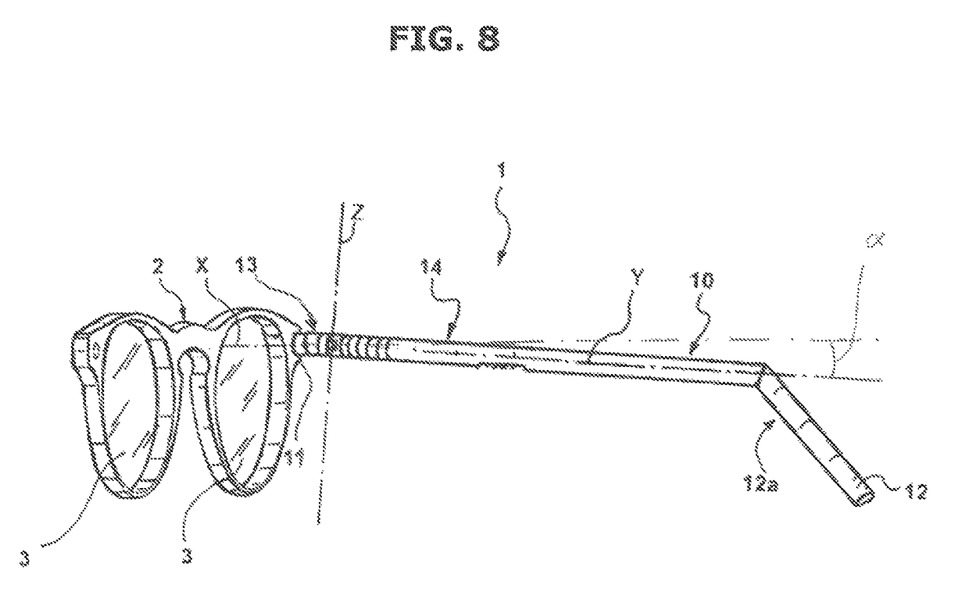
FIG. 8 is a view of the spectacles of FIG. 1 at the end of the adjustment of the pantoscopic angle shown in FIGS. 7A to 7D.

In this final situation, the hinge axis Z is on the vertical plane V, so that the arm 10 can be oscillated to the closed position in the correct manner, and the second axis Y is located on the same vertical plane as the first axis X, but is inclined relative to it at a desired angle (indicated by α in FIG. 8).

By way of example, if the bearing plane A is inclined at about 10°, then starting from the initial configuration and rotating the second portion about the adjustment axis K through 22° 30' results in an inclination of the second axis Y, at the end of the rotations described above, of just under 4° relative to the first axis X, with a corresponding variation of the pantoscopic angle of the spectacles 1.

This variation of the inclination of the arm on the vertical plane results in a lowering of the arm by about 8 mm at the curvature of the second end 12.

The inclination of the second end 12 can be adjusted relative to the vertical plane V, independently of the adjustment of the vertical inclination of the arm.

By translating the inner body 35 away from the fifth element 33 into the adjustment position, the terminal body 34 can be rotated as desired about the second axis Y, moving the second end 12 towards or away from the user's head.

A further possible adjustment of the arm 10 concerns its length.

This can be varied by disengaging and removing the terminal body 34 from the inner body 35, after disengaging the tab 36 from the seat 37 in which it is housed, then changing the number of spacer elements 39 fitted on the inner body 35 and finally refitting the terminal body 34 on to the inner body 35 until the tab 36 engages another seat 37 located at the desired distance.

Thus the present invention resolves the problem of the prior art identified above, while also offering numerous other benefits, including ample possibilities for the adjustment of the geometrical dimensions of the arm, each independently of the others.

The invention claimed is:

1. Spectacles (1) comprising a front frame (2) configured to support at least one lens (3), and a pair of arms (10), wherein each arm:
   extends between a first end (11), attached to the front frame, and a second, longitudinally opposed end (12),
   comprises a first portion (20) associated with the first end and extending along a first axis (X), and
   comprises a second portion (30), associated with the second end, which extends along a second axis (Y) coplanar with the first axis (X), and abuts the first portion (20) at a first bearing plane (A) which is not perpendicular to the first and second axes, and is selectively rotatable relative to the first portion (20) about an adjustment axis (K) perpendicular to the first bearing plane (A) to vary the inclination between the first and the second axis,
wherein:
   the first portion comprises a first element (21) attached to the front frame (2) and a second element (22) abutting the first element (21), on a side opposite the front frame, at a second bearing plane (B) perpendicular to the first axis (X), the second element (22) being selectively rotatable relative to the first element (21) about the first axis so as to rotate the position of the plane formed by the first and second axes, and the second portion (30) comprises a third element (31) abutting the first portion (20) and a fourth element (32) which abuts the third element, on a side opposite the first portion (20), at a third bearing plane (C) perpendicular to the second axis (Y), and which is selectively rotatable relative to the third element about the second axis, at least one of the second portion (30), the second element (22) and the fourth element (32) is movable relative to the first portion (20) or, respectively, relative to the first element (21) or relative to the third element (31), between an engaged position in which the first and second portion (20, 30), or, respectively, the first and second element (21, 22) or the third and fourth element (31, 32) are mutually fixed with respect to rotation, and an adjustment position in which the first and second portion (20, 30) or, respectively, the first and second element (21, 22) or the third and fourth element (31, 32) are rotatable, respectively, about the adjustment axis (K), the first axis (X) or the second axis (Y), the first and second portion (20, 30) or, respectively, the first and second element (21, 22), or the third and fourth element (31, 32) are abutted at respective bearing surfaces on which respective front toothed rings are formed, these rings being mutually engagable when the first and second portion (20, 30) or, respectively, the first and second element (21, 22) or the third and fourth element (31, 32) are moved to the engaged position.

2. The spectacles according to claim 1, wherein the second portion (30) or the second element (22) or the fourth element (32) is translatable to a limited extent relative to the first portion (20) or, respectively, relative to the first element (21) or relative to the third element (31), between the engaged position, in which the second portion (30) or the second element (22) or the fourth element (31) abuts the first portion (20) or, respectively, the first element (21) or the third element (31), and the adjustment position, in which the second portion (30) or the second element (22) or the fourth element (32) is spaced apart from the first portion (20) or, respectively, the first element (21) or the third element (31).

3. The spectacles according to claim 1, wherein a collar with a circular section (31c, 22f, 31g) is provided between the first and second portion (20, 30) or, respectively, between the first and second element (21, 22) or between the third and fourth element (31, 32), this collar projecting from one of the bearing surfaces towards the other bearing surface.

4. The spectacles according to claim 3, wherein the collar (31c) is placed in a radially inner position relative to the front toothed ring (31b) between the first and second portion (20, 30).

5. The spectacles according to claim 3, wherein the collar (22f, 31g) is placed in a radially outer position relative to the front toothed ring (22e, 31f) between the first and second element (21, 22), or between the third and fourth element (31, 32), in extension of an outer surface of the first or second element (21, 22), or of the third and fourth element (31, 32).

6. The spectacles according to claim 1, wherein the first and second portion (20, 30) or the first and second element (21, 22) or the third and fourth element (31, 32) are elastically biased towards the engaged position.

7. The spectacles according to claim 1, wherein, in an initial configuration of the arm, the first axis (X) and the second axis (Y) are substantially aligned.

8. The spectacles according to claim 1, wherein the adjustment axis (K) is inclined at an angle in a range from 1° to 30° relative to the first axis (X) and the second axis (Y).

9. The spectacles according to claim 1, wherein the arm (10) further comprises a first section (13) attached to the front frame (2) at the first end (11), a second section (14) including the second end (12), and a hinge mechanism (15) provided between the first and second section to allow the second section (14) to swing about a hinge axis (Z) substantially parallel to the front frame, between an open position in which the second section is swung away from the front frame and a closed position in which the second section is swung to a position next to the front frame.

10. The spectacles according to claim 9, wherein the first, second and third bearing planes (A, B, C) intersect the arm (10) in the second section (14).

11. The spectacles according to claim 9, wherein the first, second and third bearing planes (A, B, C) intersect the arm in the first section (13).

12. The spectacles according to claim 9, wherein the hinge mechanism comprises a first pin (16) translationally fixed to the front frame (2) and housed and engaged within the first section (13), and a second pin (17) pivoted on the first pin at the position of the hinge axis (Z) by means of a ring coupling.

13. The spectacles according to claim 12, wherein the second pin (17) is housed within the second section (14) while being translatable relative to the second section, the second pin being biased towards the inside of the second section by an elastic element (40).

14. The spectacles according to claim 12, wherein the first pin (16) is pivoted at the position of the first bearing plane (A) by means of a ring coupling on a hook (19) fixed to the front frame.

15. The spectacles according to claim 9, wherein the second portion (30) comprises, in the second section (14), an auxiliary articulation (33, 38) to allow rotation of the second end (12) about the second axis (Y).

16. The spectacles according to claim 9, wherein the second portion (14) comprises a terminal body (34), fixed to the second end (12), which is fitted slidably along the second axis (Y) on an inner body (35) of the second section, the terminal body (34) being selectively fixable to the inner body (35).

17. The spectacles according to claim 16, wherein at least one removable spacer element (39) is interposed between the inner body (35) and the terminal body (34).

18. The spectacles according to claim 16, wherein the inner body (35) is rotatable about the second axis (Y) relative to a hinge element (33) of the second section, at the position of the auxiliary articulation (33, 38).

19. The spectacles according to claim 16, wherein the second pin (17) of the hinge mechanism and the elastic element (40) are housed slidably within the inner body (35).

20. The spectacles according to claim 1, wherein a groove (22g, 31d, 32c) is formed on an outer surface of at least one of the second element (22), the third element (31) and the fourth element (32), to facilitate the gripping of the at least one element and its translational movement.

* * * * *